US008291230B2

(12) United States Patent
Moore et al.

(10) Patent No.: US 8,291,230 B2
(45) Date of Patent: Oct. 16, 2012

(54) METHOD AND SYSTEM FOR SIGNING JAVASCRIPT OBJECT NOTATION (JSON) MESSAGES

(75) Inventors: Timothy Walter Moore, Pflugerville, TX (US); Patrick Ryan Wardrop, Austin, TX (US); Michael McIntosh, Clifton, NJ (US)

(73) Assignee: International Business Machines Corporation, Armonk, NY (US)

( * ) Notice: Subject to any disclaimer, the term of this patent is extended or adjusted under 35 U.S.C. 154(b) by 898 days.

(21) Appl. No.: 12/356,290

(22) Filed: Jan. 20, 2009

(65) Prior Publication Data

US 2010/0185869 A1   Jul. 22, 2010

(51) Int. Cl.
    H04L 9/32        (2006.01)
    G06F 21/00       (2006.01)
    G06F 15/16       (2006.01)
    H04L 12/58       (2006.01)
    H04W 4/14        (2009.01)
    H04W 4/18        (2009.01)
    H04M 11/00       (2006.01)
(52) U.S. Cl. .................. 713/176; 713/184; 709/206
(58) Field of Classification Search .............. 713/176, 713/184; 709/206
    See application file for complete search history.

(56) References Cited

U.S. PATENT DOCUMENTS

2008/0270802 A1* 10/2008 Ashley et al. ................. 713/184
2009/0240774 A1*  9/2009 Sachtjen et al. .............. 709/206

FOREIGN PATENT DOCUMENTS

JP          4889813 B1 *   3/2012

OTHER PUBLICATIONS

Downes, S.; Belliveau, L.; Samet, S.; Abdur Rahman, M.; Savoie, R.; "Managing Digital Rights Using JSON"; Consumer Communications and Networking Conference (CCNC), 2010 7th IEEE; Digital Object Identifier 10.1109/CCNC.2010.5421662; Publication Year: Jan. 2010 , pp. 1-10.*
Schwartz, Michael, "JSON Hijacking and How Ajax.NET Professional (AjaxPro) Avoids these Attacks," Apr. 7, 2007.
Yoshihama et al., "Overcome security threats for Ajax applications," Jun. 19, 2007.
"JSON vs. XML: Browser Security Model," Jan. 2, 2007.

* cited by examiner

*Primary Examiner* — Eleni Shiferaw
*Assistant Examiner* — Courtney Fields
(74) *Attorney, Agent, or Firm* — Jeffrey S. LeBaw; David H. Judson

(57) ABSTRACT

A machine-implemented method for signing a JSON message begins by constructing a reference element for each data object in the JSON message. The data object is identified by a reference identifier that includes a pointer to a digest method, and a digest generated by applying the digest method to the data object. Then, a signature information element is constructed for reference elements corresponding to data objects in the message. The signature information element includes a pointer to a signature method, as well as one or more reference elements, or a canonical form of the one or more reference elements. Then, a signature element is constructed that includes the signature information element, and a signature value generated by applying the signature method to the signature information element. The signature enables a sending entity to generate a digest on a JSON message and to secure the digests using a signing key.

23 Claims, 4 Drawing Sheets

METHOD AND SYSTEM FOR SIGNING JAVASCRIPT OBJECT NOTATION (JSON) MESSAGES

CROSS-REFERENCE TO RELATED APPLICATIONS

This application is related to Ser. No. 12/356,305, filed Jan. 12, 2009, titled "Method and system for encrypting JavaScript Object Notation (JSON) Messages".

COPYRIGHT STATEMENT

A portion of the disclosure of this patent document contains material that is subject to copyright protection. The copyright owner has no objection to the facsimile reproduction of the patent document as it appears in the Patent & Trademark Office file or records, but it otherwise reserves all copyright rights.

BACKGROUND OF THE INVENTION

1. Technical Field

This disclosure relates generally to adding integrity to JavaScript Object Notation (JSON) messages to protect these messages over a communication link.

2. Background of the Related Art

Asynchronous JavaScript and XML (collectively referred to as AJAX) are well-known technologies that allow user interaction with Web pages to be decoupled from the Web browser's communications with a Web server. AJAX is built upon dynamic HTML (DHTML) technologies including: JavaScript, a scripting language commonly used in client-side Web applications; the Document Object Model (DOM), a standard object model for representing HTML or XML documents; and Cascading Style Sheets (CSS), a style sheet language used to describe the presentation of HTML documents. In AJAX, client-side JavaScript updates the presentation of a Web page by dynamically modifying a DOM tree and a style sheet. In addition, asynchronous communication, enabled by additional technologies, allows dynamic updates of data without the need to reload the entire Web page. These additional technologies include XMLHttpRequest, an application programming interface (API) that allows client-side JavaScript to make HTTP connections to a remote server and to exchange data, and JavaScript Serialized Object Notation (JSON), a lightweight, text-based, language-independent data-interchange format.

JSON is based on a subset of the JavaScript Programming Language, Standard ECMA-262, $3^{rd}$ Edition, dated Dec. 1999. It is also described in Request for Comment (RFC) 4627. JSON syntax is a text format defined with a collection of name/value pairs and an ordered list of values. JSON is very useful for sending structured data over the wire (e.g., the Internet) that is lightweight and easy to parse. It is language-independent but uses conventions that are familiar to C-family programming conventions. Further information about JSON can be found as json.org.

Currently, JSON messages are secured over the wire using mere transport security (such as SSL), which only provides point-to-point message security. The data in the message, however, can still be compromised through malicious altering by an attacker, or accidental altering through transmission errors.

There remains a need to add message integrity to JSON messages.

BRIEF SUMMARY OF THE INVENTION

JSON message integrity is provided using a digital signature scheme. The digital signature scheme implements a JSON signature syntax, together with a set of processing rules for creating and representing digital signatures.

The JSON signature syntax preferably comprises a set of named elements, including a reference element, a signature information element, and a signature element. In one embodiment, a machine-implemented method for signing a JavaScript Object Notation (JSON) message begins by constructing a reference element for each data object in the JSON message to be signed. The data object is identified by a reference identifier. The reference element includes the reference identifier, a pointer (such as a URI) to a digest method, and a digest generated by applying the digest method to the data object or a given function of the data object. Then, a signature information element is constructed for one or more of the reference elements corresponding to the one or more data objects in the message that are being signed. The signature information element includes a pointer to a signature method, as well as one or more reference elements, or a canonical form of the one or more reference elements. Then, a signature element is constructed. The signature element includes the signature information element, a key information element that includes a key value, and a signature value generated by applying the signature method (identified in the signature information element) to the signature information element. The key value is useful to verify the signature value. The signature element is the JSON message signature, and it provides message integrity (through the digest method) and authentication (through the signature method).

According to another aspect, a machine-implemented method is executed at a first processing device, where the first processing device is adapted to exchange data with a second processing device over a communications network using structured data messages. A structured data message comprises a collection of name/value pairs, and an ordered list of values. A representative type of data message having this syntax is a JSON request message being transmitted from a Web browser on the first processing device to a Web server on the second processing device. According to the method, a digest is generated on all or parts of the request message and the digests are secured using a signing key. In particular, for each data object in the message to be signed, a reference element is constructed, where the reference element includes a reference identifier, a pointer to a digest method, and a digest generated by applying the digest method to the data object or a given function of the data object. A signature element is constructed from the one or more reference elements. In particular, the signature element includes a signature information element associated with the one or more reference elements, together with a signature value generated by applying a signature method to the signature information element. The signature information element includes a pointer to the signature method, and a canonical form of one or more reference elements. The message and the signature element are output to the second processing device from the first processing device.

In one embodiment, the signature element is detached from the message. In particular, the signature is generated over data in the message that is external to the signature element. In another embodiment, the signature element is enveloped within the message. In this case, the signature is generated over data in the message that includes the signature element.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
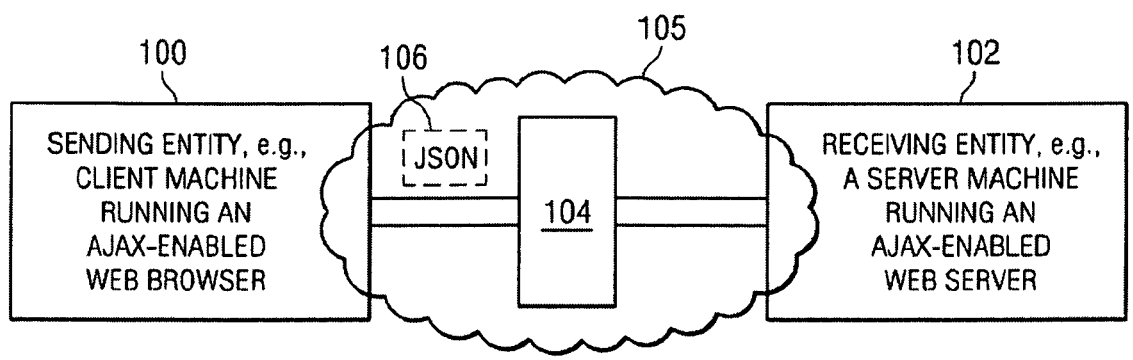
FIG. 1 depicts a networking environment wherein JSON messages are communicated from a sender to a receiver and in which the subject disclosure may be implemented.

In a typical scenario, illustrated in FIG. 1, JSON messages are sent from an initial sender 100 to an ultimate receiver 102 along a JSON message path comprising zero or more intermediaries 104. The devices 100, 102 and 104 are computing entities, such as data processing systems each comprising hardware and software, which entities communicate with one another over a network, such as the publicly-routed Internet 105 (in this example), an intranet, an extranet, a private network, a wireless link, or any other communications medium or link. As described below, a data processing system typically comprises one or more processors, an operating system, one or more applications and one or more utilities. A given data processing system may be a sender or sending entity, in which case the system is deemed to be on a "sender side" of the transmission, or a receiver or receiving entity, in which case the system is deemed to be on a "receiver side." JSON messages, such as message 106, may flow in either direction. Typically, the sender 100 is a Web browser, and the receiver is a Web server 102, or vice versa. In AJAX, client-side JavaScript updates the presentation of a Web page displayed in the browser 100 by using the XMLHttpRequest API (or the like) to communicate to server 102 asynchronously, with the resulting request/response typically involving the exchange of one or more JSON (or other structured data) messages. In the prior art, the JSON messages are delivered over the wire in the clear, although point-to-point security typically is used (between sender and receiver) using transport layer security mechanisms, such as HTTP over TLS (Transport Layer Security). In a typical scenario, the sending entity is a client machine executing an AJAX-enabled Web browser, and the receiving entity is a server machine executing an AJAX-enabled Web server. By "AJAX-enabled," a particular device has the capability of creating and processing messages using AJAX technologies. Of course, these are merely representative data processing systems.

By way of additional background, known JSON syntax is built on two structures: a collection of name/value pairs, and an ordered list of values. The collection of name/value pairs goes by different nomenclature depending on the language involved, and this structure typically is realized as an object, a record, a struct, a hash table, a keyed list or an associative array. For discussion purposes, the object nomenclature will be used. The ordered list of values also goes by different nomenclature depending on the language involved, and this structure typically is realized as an array, a vector, a list or a sequence. For discussion purposes, the array nomenclature will be used.

An object is an unordered set of name/value pairs. An object begins with "{" (left brace) and ends with "}" (right brace). Each name is followed by ":" (colon) and the name/value pairs are separated by "," (comma):

object={string:value}.

An array is an ordered collection of values. An array beings with "[" (left bracket) and ends with "]" (right bracket). Values are separated by "," (comma):

array=[value].

A value can be a string in double quotes, or an object, or an array. These structures can be nested, such as value=string∥object∥array.

Figure 2:
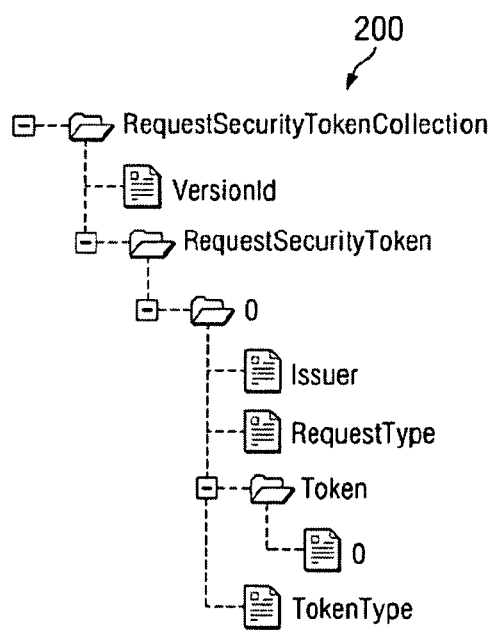
FIG. 2 is a representative JSON request message.

FIG. 2 illustrates a representative JSON request message 200. This message is illustrated in its tree format to show the hierarchical nature of the message according to the above-described JSON syntax. In this example, the ReferenceId (as will be described in more detail below) is RequestSecurityTokenCollection. This is the top level key (name) of the message, and its value is the whole message. Additional. ReferenceId examples are:

RequestSecurityTokenCollection.RequestSecurityToken[0], which represents the first RequestSecurityToken in the array. Each element in the array in denoted by the brackets and comma separated, as described above.

RequestSecurityTokenCollection.RequestSecurityToken[0].Token[0], which represents the first Token in the first RequestSecurityToken.

RequestSecurityTokenCollection.RequestSecurityToken[0].RequestType which represents a pointer to RequestType.

As will be seen, all elements of a message can be identified by this notation. Duplicate keys at the same level are not allowed because the message comprises a collection of name/value pairs, so the ReferenceId notation is guaranteed to be unique.

According to this disclosure, one or more data objects in a JSON message are signed, as is now described in more detail.

The following Table 1 describes a JSON Signature syntax according this disclosure. The JSON signature comprises a set of properties that are described as follows:

| Property/Element/Object | Description |
| --- | --- |
| Signature | The element to digitally sign the message |
| VersionId | This optional element is used to identify the version of the JSON signature element, specified as a URI. |
| SignedInfo | The information that is actually signed. The validation of SignedInfo comprises validation of the signature over SignedInfo and validation of each Referenced digest within SignedInfo. The algorithms used in calculating SignatureValue preferably are also included in the signed information while the SignatureValue element preferably is outside. This element is required. |
| Canonicalization-Method | The method used to canonicalize the SignedInfo object before it is digested (signed) as part of the signature process. This element is required |

| Property/<br>Element/Object | Description |
|---|---|
| Signature-<br>Algorithm | The algorithm used to convert the canonicalized SignedInfo into a SignatureValue. Typically, it is a combination of a digest algorithm and a key dependent algorithm. Preferably, the Signature-Algorithm is signed as part of SignedInfo to resist attacks based on substituting a weaker algorithm. This element is required. |
| ReferenceId[ ] | Each Reference element represents a digest method and resulting digest value on a piece of the message (a data object) identified by the ReferenceId. It may include Transforms that were used to produce the input to the digest. This element is required. |
| Transforms[ ] | An ordered array of transform algorithm URIs. These are the one or more method(s) used to process the Reference element before the data object associated therewith is digested. An output of a transform may be supplied as an input to another. This element is optional. |
| Digest | A base64 encoded digest string of a piece of the message (the data object) identified in the Reference element. This element is required |
| DigestAlgorithm | A URI (a pointer) for the algorithm used to generate the Digest, This is required. |
| ReferenceId | The key that identifies the message for the Reference element. This is a required element. |
| KeyInfo | The key information used to look up the public key to verify the SignatureValue. Typically, this is the X509 subject key identifier. It is a required element. |
| SignatureValue | A signed digest on the canonicalization of the SignedInfo object. The array of Reference objects in the SignedInfo object is ordered, so that the canonicalization method would include sorting the Reference object contents. This is a required element. |

The nomenclature set forth above should not be taken as limiting. Thus, for example, the "reference element," the "signature information element" and "signature element" may be generalized into "first," "second" and "third" elements without loss of generality.

The following description summarizes one technique according to this disclosure for signing and validating a JSON message. In one embodiment, the signing process comprises two (2) distinct phases: Reference Generation, and Signature Generation. Reference Generation is carried out for each data object being signed in the JSON message. Each such data object (to be signed) is identified by its ReferenceId. That message may include one or more such data objects, and it is not required that all of the data objects in a message be signed. The Reference Generation phase is iterated for each data object being signed as illustrated in the process flow diagram of FIG. 3. The routine begins at step 300 by applying the one or more Transforms, as determined by the URIs, to the data object pointed to by the ReferenceId. One such Transform is a canonicalization method that, as described in more detail below, takes a data object and generates an "ordered data object" (sometimes referred to herein as a "canonical form" of the data object). An ordered data object allows control of the serialization order of attributes when serializing out to a string. At step 302, a Digest value is calculated over the data object that results from applying the one or more Transforms. This value is calculated by applying the DigestAlgorithm (sometimes referred to herein as a digest method). At step 304, a Reference element is constructed. The Reference element, as noted above, includes the identification of the data object (namely, the ReferenceId), a pointer to the DigestAlgorithm, and the Digest. It may also include any (optional) Transform elements. This completes the Reference Generation phase for the particular data object. As mentioned, this process is repeated for each data object to be signed in the message.

Figure 3:
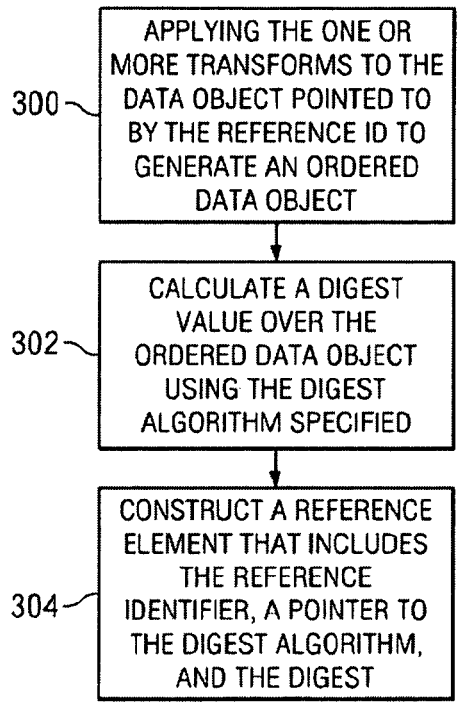
FIG. 3 is a process flow diagram of a Reference Generation routine according to this disclosure.
Figure 4:
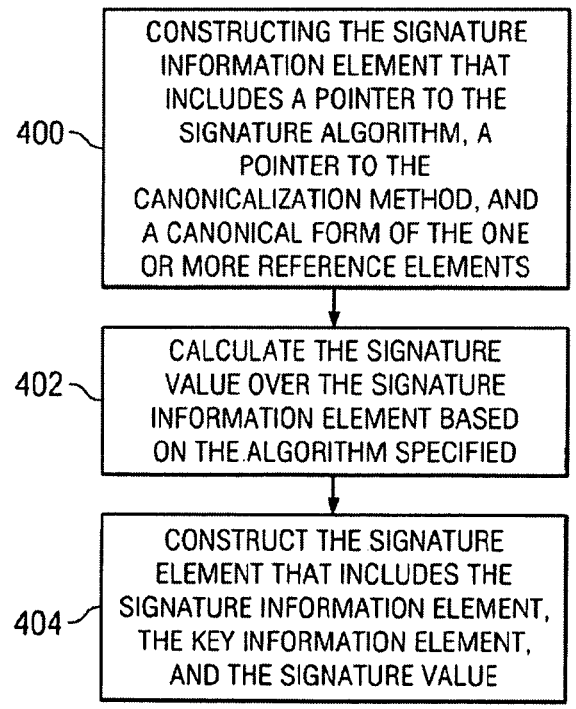
FIG. 4 is a modified Signature Generation routine according to this disclosure.

FIG. 4 illustrates the Signature Generation phase. This phase typically operates over a set of Reference elements, each of which has been constructed according to the technique described above with respect to FIG. 3. Thus, if there are three (3) distinct data objects to be signed in the JSON message, the process of FIG. 3 is repeated for each data object. Then, the process of FIG. 4 is carried out over the set of Reference elements. Of course, if only one data object in the message is being signed, the process of FIG. 4 is carried out over just the single Reference element associated therewith. The routine begins at step 400 by constructing the SignedInfo element. This element includes a pointer to the SignatureAlgorithm, a pointer to a CanonicalizationMethod, and a canonical form of the one or more Reference elements (which elements correspond to the one or more respective data objects of the message that are being signed). As will be described in more detail below, the canonical form of the one or more Reference elements is generated by applying the CanonicalizationMethod specified in the SignedInfo element. At step 402, the routine calculates the SignatureValue over SignedInfo based on the algorithm (sometimes referred to as a method) specified in the SignedInfo element. The SignatureValue is the digital signature of the signature information element, and the signature element represents the signature of the JSON message. At step 404, the routine constructs the Signature element that includes SignedInfo, KeyInfo, and SignatureValue, as those elements and values have been described above. This completes the Signature Generation process.

The following illustrates an example of a request message that is digitally signed using a JSON signature scheme such as described above with respect to FIGS. 3-4. In this example, the signature is outside the message. In particular, this is a "detached" signature over the data in the message that is external to the Signature element.

```
{ "RequestSecurityTokenCollection": {
    "VersionId": "http://www.ibm.com/2008/07/json-rstc",
    "RequestSecurityToken": [
        {
            "Issuer": "ESSUSERNAMETOKEN",
            "RequestType":
"http://schemas.xmlsoap.org/ws/2005/02/trust/Validate",
            "Token": [
"PHdzczpVc2 ... W1lVG9rZW4+"
            ],
            "TokenType":
"http://www.ibm.com/websphere/appserver/tokentype#LTPAv2"
        }
    ]
},
"Signature": {
    "VersionId": "http://www.ibm.com/2008/07/json-dsig",
    "SignedInfo": {
        "CanonicalizationMethod": "http://www.ibm.com/2008/07/
        json-c14n",
        "SignatureAlgorithm": "http://www.w3.org/2000/09/
        xmldsig#rsa-sha1",
        "Reference": [
            {
                "Digest": "CZONTL32O6UjUZyjMEmCfR3ViEw=",
                "DigestAlgorithm": "http://www.w3.org/2000/09/
                xmldsig#sha1",
                "ReferenceId": "RequestSecurityTokenCollection",
                "Transforms": [
                    {
                        "Algorithm": "http://www.ibm.com/2008/07/json-c14n"
                    }
                ]
            }
        ],
    },
    "KeyInfo": {
        "X509Data": {
```

-continued

```
        "X509SKI": "R8ReXSemNK ... QWGNM="
      }
    },
    "SignatureValue":
"Y7f7FY1ZPQfjCrZqB ... fAQpAVMQ=",
  }
}
```

The following illustrates another example of a request message that is digitally signed using the JSON signature scheme. It uses a signature contained within the message. In this latter approach, the signature is over the data in the message that includes the signature element. This approach is sometimes referred to as an enveloped signature. When this approach is used, the CanonicalizationMethod in the transform excludes the signature from the message identified in the ReferenceId before canonicalization occurs.

```
( "RequestSecurityTokenCollection": {
    "VersionId": "http://www.ibm.com/2008/07/json-rstc",
    "RequestSecurityToken": [
      {
        "Issuer": "ESSUSERNAMETOKEN",
        "RequestType":
"http://schemas.xmlsoap.org/ws/2005/02/trust/Validate",
        "Token": [
"PHdzczpVc2 ... Wl1VG9rZW4+"
        ],
        "TokenType":
"http://www.ibm.com/websphere/appserver/tokentype#LTPAv2"
      }
    ],
    "Signature": {
      "VersionId": "http://www.ibm.com/2008/07/json-dsig",
      "SignedInfo": {
        "CanonicalizationMethod": "http://www.ibm.com/2008/07/json-c14n",
        "SignatureAlgorithm": "http://www.w3.org/2000/09/xmldsig#rsa-sha1",
        "Reference": [
          {
            "Digest": "CZONTL32O6UjUZyjMEmCfR3ViEw=",
            "DigestAlgorithm":
"http://www.w3.org/2000/09/xmldsig#sha1",
            "ReferenceId": "RequestSecurityTokenCollection",
            "Transforms": [
              {
                "Algorithm": "http://www.ibm.com/2008/07/json-c14n-env"
              }
            ]
          }
        ],
      },
      "KeyInfo": {
        "X509Data": {
          "X509SKI": "R8ReXSemNK ... QWGNM="
        }
      },
      "SignatureValue":
"Y7f7FYlZPQfjCrZqB ... fAQpAVMQ=",
    }
  }
}
```

The Signature preferably is validated before being sent on the wire. Preferably, validation includes two aspects: Reference Validation, which verifies the Digest contained in each Reference in SignedInfo, and cryptographic signature validation of the SignatureValue calculated over SignedInfo. These are conventional operations.

Although not meant to be limiting, the signature methods may be any known algorithms such as: (a) DSA with SHA-1 signature algorithm which uses the SHA-1 digest algorithm and DSA to create and verify DSA digital signatures as defined in FIPS Publication 186, or (b) the signature algorithm with SHA-1 and the RSA encryption algorithm as defined in the OSI Interoperability Workshop, using the padding conventions described in PKCS #1. A representative message digest algorithm is the Secure Hash Algorithm, as defined in Secure Hash Standard, NIST FIPS Publication 180-1. An MD5 message digest algorithm may be used as well. These algorithms are merely representative, however, as any known or later-developed digest and/or signature algorithms may be used.

Figure 5:
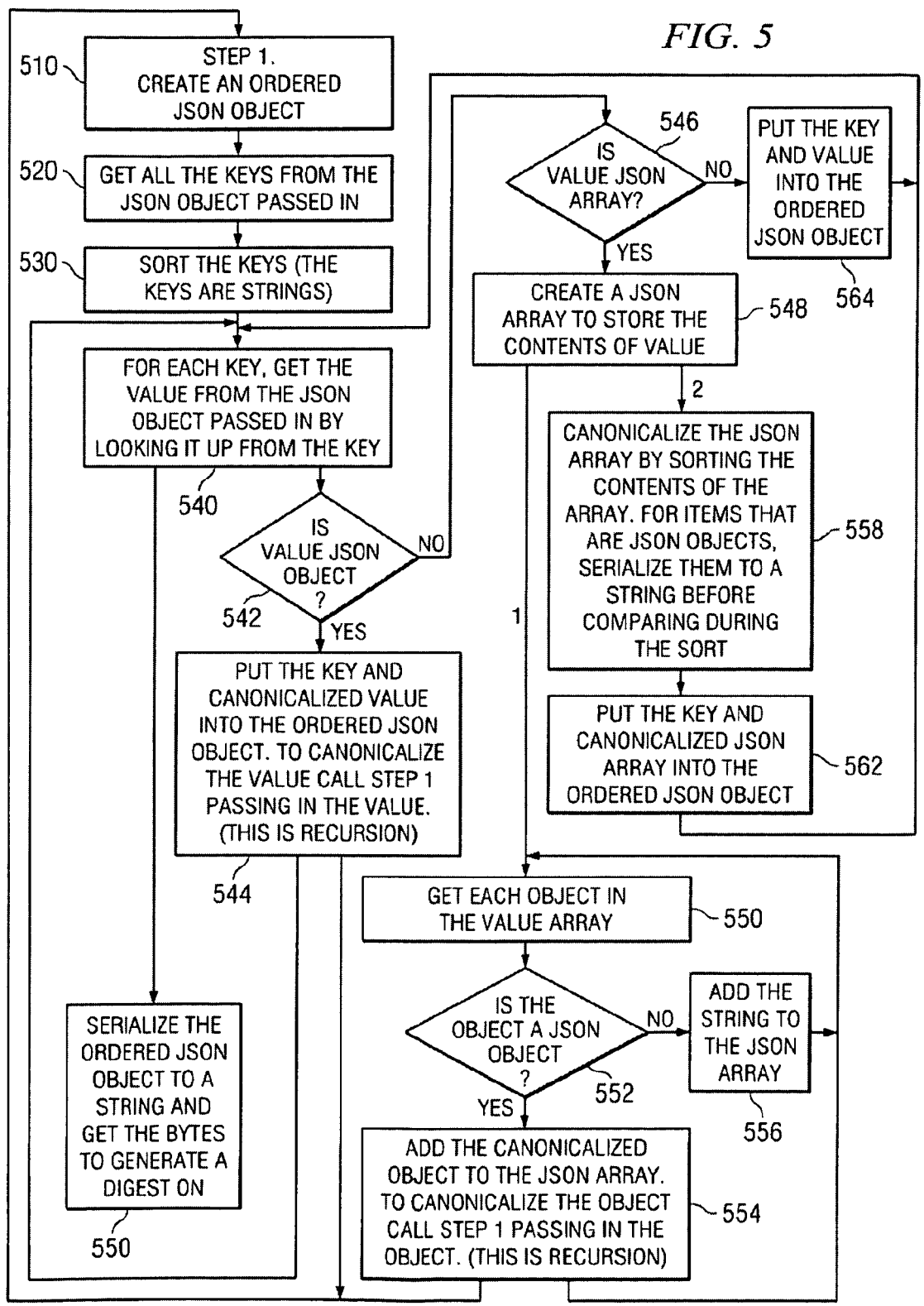
FIG. 5 is a process flow diagram of a representative CanonicalizationMethod that may be used as a Transform in the signature scheme.

A preferred canonicalization method is now described with respect to the process flow diagram of FIG. 5. The method begins at step 510 by creating an Ordered JSON Object. At step 520, all the keys from the JSON Object get passed in (to the Ordered JSON Object). At step 530, the method sorts the keys, which are strings. The method then iterates as follows, for each key. In particular, at step 540, the method gets the value from the JSON Object passed in by looking it up from the key. A test is then performed at step 542 to determine if the value is a JSON Object. This is step 544. If so, the method puts the key and canonicalized value into the Ordered JSON Object. To canonicalize the value, the method calls step 510, passing in the value (this is recursion). If the outcome of the test at step 542 is negative, a test is performed at step 546 to determine if the value is a JSON Array. If so, the method continues at step 548 and creates a JSON Array to store the contents of the value. The method then continues at step 550 to get each object in the value array. It then performs the following sub-loop. In particular, a test is performed at step 552 to determine if the object is a JSON Object. If the outcome of the test at step 552 is yes, the method continues at step 554 to add the canonicalized object to the JSON Array. To canonicalize the object, the method calls step 510, passing in the object (this is recursion). If, however, the outcome of the test at step 552 is negative (because the object is not a JSON Object), and if the object is a string, the string is added to the JSON Array at step 556. After each object in the value array is processed, the method continues at step 558 to canonicalize the JSON array, e.g., by sorting the contents of the array. For items that are JSON objects, during the sort the method serializes them to a string before comparing. At step 562, the method puts the key and canonicalized JSON array in the Ordered JSON Object.

If the outcome of the test at step 546 is negative (because the value is not a JSON Object and is not a JSON Array), and if the value is a string, the method puts the key and value into the Ordered JSON Object. This is step 564. This completes the processing for each key in the loop defined by step 540. The method then completes at step 550. In this step, the Ordered JSON Object is now serialized to a string, and it is against this string that the digest or signature (as the case may be) is generated.

In particular, when the canonicalization method of FIG. 5 is used as a Transform, the DigestAlgorithm is applied to the string (output in step 550) to generate the Digest. When the canonicalization method of FIG. 5 is used as the CanonicalizationMethod, the string (output in step 550) becomes part of the SignedInfo element, which when processed by SignatureAlgorithm generates the SignatureValue. As noted above, for the enveloped signature approach, the signature element is excluded before canonicalization.

As can be seen, a canonicalization algorithm such as described above orders the JSON message Reference elements. This operation generates a "canonical form" of these elements (for use, for example, as part of the SignedInfo element). The canonical form of the data object may be generated using this approach as well. In particular, the canonicalization method sorts the contents of the JSON message recursively and creates an Ordered JSON Object on which to generate the appropriate digest. An Ordered JSON Object allows control of the serialization order of attributes. The order in which items are put into the instance controls the order in which they are serialized out. For canonicalization to work, no spaces are allowed in the JSON syntax for the message. As can be seen from the JSON syntax, the canonicalization method recursively calls itself, sorting the contents of the message, which includes the keys and values. A value can obtain another object and an array, and this is where the recursion is performed. When serializing out to a string (i.e., to turn into bytes for digesting), the Ordered JSON Object allows control of the serialization order of attributes.

This canonicalization operation generates a "canonical form" of the Reference elements (for use, for example, as part of the SignedInfo element). The canonical form of the data object may be generated using this approach as well.

The techniques described herein are advantageous. The disclosed subject matter solves the problem of JSON message integrity. Using the signature syntax as described, a sending entity can provide message integrity and authentication through message digests and signatures. The JSON signature allows the sender to generate a digest on all or parts of a JSON request message and then to secure the digests using a signing key. The JSON signature scheme provides a convenient way of identifying the data object in the message and canonicalizing the data for generating the digest. The signature technique is lightweight and fast to parse, resulting in increased performance and smaller disk and memory footprint. By implementing JSON message integrity in this manner, an additional layer of security (over and above any transport layer security) is applied to the message. Thus, the data in the message is further secured against malicious altering by an attacker (who can compromise the transport security), or against accidental altering through transmission errors. Using this approach, the sending entity need not even use transport security.

Figure 6:
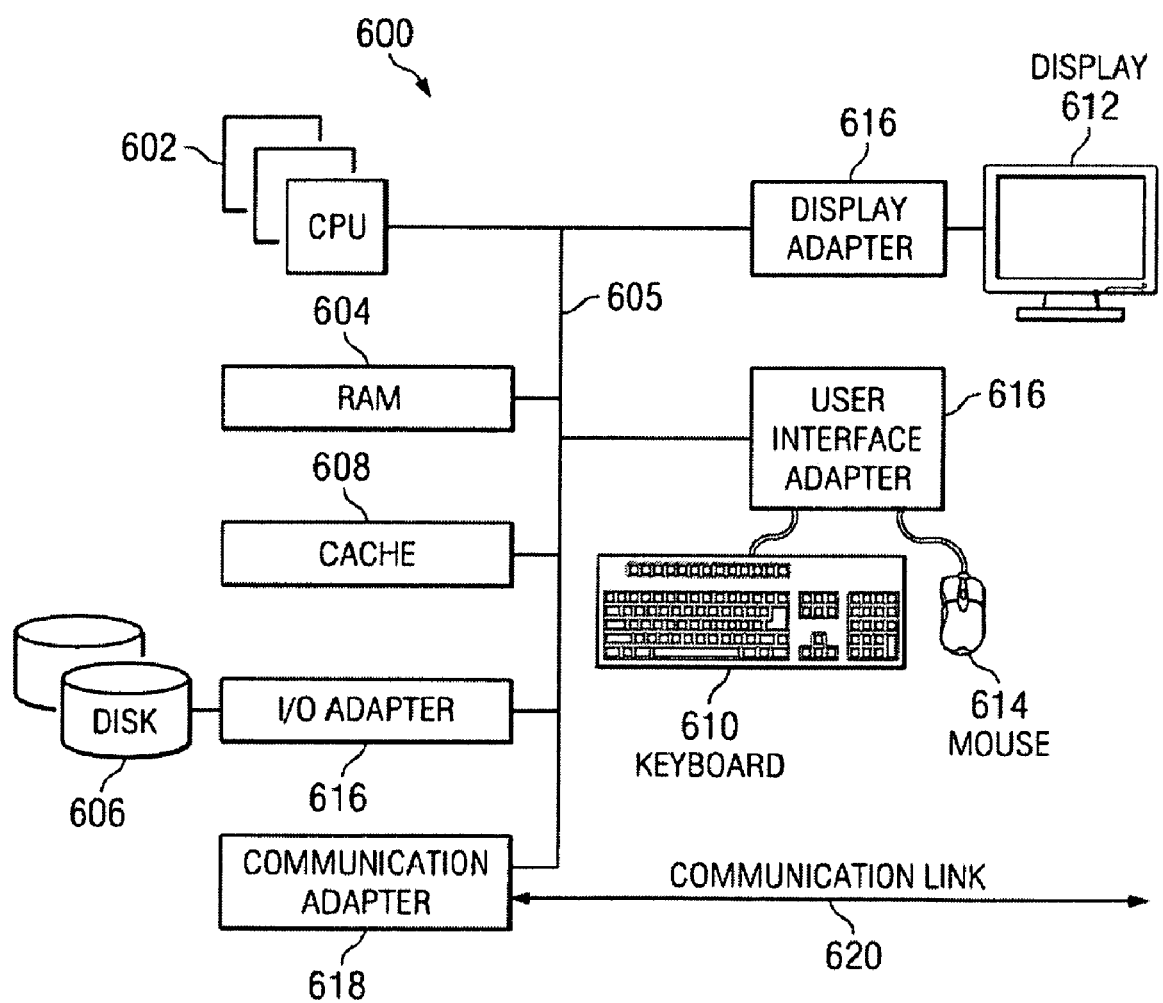
FIG. 6 is a block diagram of a representative data processing system in which the signature scheme may be implemented.

FIG. 6 illustrates a representative data processing system 600 for use as the sending or receiving entity. A data processing system 600 suitable for storing and/or executing program code will include at least one processor 602 coupled directly or indirectly to memory elements through a system bus 605. The memory elements can include local memory 604 employed during actual execution of the program code, bulk storage 606, and cache memories 608 that provide temporary storage of at least some program code to reduce the number of times code must be retrieved from bulk storage during execution. Input/output or I/O devices (including but not limited to keyboards 610, displays 612, pointing devices 614, etc.) can be coupled to the system either directly or through intervening I/O controllers 616. Network adapters 618 may also be coupled to the system to enable the data processing system to become coupled to other data processing systems or devices through intervening private or public networks 620.

The disclosed subject matter can take the form of an entirely hardware embodiment, an entirely software embodiment or an embodiment containing both hardware and software elements. In one embodiment, the JSON signature syntax and associated routines (including the canonicalization method) are implemented in software, which includes but is not limited to firmware, resident software, microcode, and the like. Furthermore, as noted above, the disclosed subject matter can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The transform and related functions may also be implemented as a managed or hosted service.

In one embodiment, the program instructions are stored in a computer readable storage medium in a data processing system, and these instructions are downloaded over a network from a remote data processing system. In an alternative embodiment, the instructions are stored in a computer readable storage medium in a server data processing system, and the instructions are downloaded over a network to a remote (e.g., a client) data processing system for use in a computer readable storage medium with the remote system.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The subject matter herein is not limited to signing JSON messages. The techniques may be applied to any text-based, data-interchange message format that is used to create a portable representation of structured data. Thus, the techniques described herein apply to signing structured data messages, where a structured data message comprises a collection of name/value pairs, and an ordered list of values. Thus, the techniques described herein may be generalized for use with respect to any structured data-interchange format. Examples of such alternative formats include those where the collection of name/value pairs is a record, a struct, a hash table, a keyed list or an associative array, or where the ordered list of values is realized as a vector, a list or a sequence.

As used herein, a "given function" of a data object may be the data object itself, the ordered data object that results from applying a canonicalization method (such as described in FIG. 5) to the data object, or the data object resulting from applying other such transforms. Likewise, a "canonical form" of an object (such as a set of reference elements) may be the reference elements, or the result of applying the canonicalization method (such as described in FIG. 5) to those elements.

The following is a representative Java implementation of the canonicalization method shown in FIG. 5 (© 2009, IBM Corporation):

```
/**
 * Canonicalize JSONObject
 * @param jsonObject
 * @return
 */
public static byte[ ] canonicalizeJSONObject(JSONObject jsonObject) {
    OrderedJSONObject orderedJSONObject = getOrderedJSONObject(jsonObject);
    byte[ ] canonicalBytes = null;
    try {
        canonicalBytes = orderedJSONObject.serialize( ).getBytes("UTF-8");
    } catch (Exception e) {
        canonicalBytes = null;
    }
    return canonicalBytes;
}
/**
 * Recursive method to order a JSON object such that we can generate
 * a digest on it.
 *
 * @param jsonObject
 * @return
 */
public static OrderedJSONObject getOrderedJSONObject(JSONObject jsonObject) {
    OrderedJSONObject orderedJSONObject = new OrderedJSONObject( );
    Object keys[ ] = jsonObject.keySet( ).toArray( );
    Arrays.sort(keys);
    for (int i=0; i < keys.length; i++) {
        String key = (String)keys[i];
        Object value = jsonObject.get(key);
        if (value instanceof JSONObject) {
            orderedJSONObject.put(key, getOrderedJSONObject((JSONObject)value));
        } else if (value instanceof JSONArray){
            JSONArray orderedArray = new, JSONArray( );
            JSONArray array = (JSONArray)value;
            for (Iterator k=array.iterator( ); k.hasNext( );) {
                Object item = k.next( );
                if (item instanceof JSONObject) {
                    orderedArray.add(getOrderedJSONObject((JSONObject)item));
                } else {
                    orderedArray.add(item);
                }
            }
            Collections.sort(orderedArray, new JSONArrayComparator( ));
            orderedJSONObject.put(key, orderedArray);
        } else {
            orderedJSONObject.put(key, value);
        }
    }
    return orderedJSONObject;
}
private static class JSONArrayComparator implements Comparator {
    public int compare(Object o1, Object o2)
    {
        String s1 = "";
        String s2 = "";
        if (o1 instanceof JSONObject) {
            try {
                s1 = ((JSONObject)o1).serialize( );
            } catch(Exception e) { }
        } else if (o1 instanceof String) {
            s1 = (String)o1;
        }
        if (o2 instanceof JSONObject) {
            try {
                s2 = ((JSONObject)o2).serialize( );
            } catch(Exception e) { }
        } else if (o2 instanceof String) {
            s2 = (String)o2;
        }
        return s1.compareTo(s2);
    }
}
```

Having described our invention, what we now claim is as follows.

The invention claimed is:

1. A method for signing a JavaScript Object Notation (JSON) message, comprising:
for each data object in the JSON message to be signed, constructing a reference element, the reference element including a reference identifier, a pointer to a digest method, and a digest generated by applying the digest method to a given function of the data object;
constructing a signature information element including a pointer to a signature method, and a canonical form of one or more reference elements; and
constructing a signature element including the signature information element, and a signature value generated by applying the signature method to the signature information element;
wherein at least one of the constructing steps is performed using a processor.

2. The method as described in claim 1 wherein the signature element also includes a key information element that includes a key value for use to verify the signature value.

3. The method as described in claim 1 wherein the given function is an ordered data object generated by applying a transform operation to the data object.

4. The method as described in claim 3 wherein the transform operation is a canonicalization method.

5. The method as described in claim 4 wherein the reference element also includes a pointer to the canonicalization method.

6. The method as described in claim 1 wherein the canonical form of the one or more reference elements is generated by applying a canonicalization method to the one or more reference elements.

7. The method as described in claim 6 wherein the signature information element includes a pointer to the canonicalization method.

8. The method as described in claim 6 further including excluding given data from the signature element prior to executing the canonicalization method.

9. The method as described in claim 1 wherein the reference identifier identifies the data object in the JSON message for which the digest has been generated.

10. A method executed at a first processing device, the first processing device having a processor and adapted to exchange data with a second processing device over a communications network using structured data messages, a structured data message comprising a collection of name/value pairs, and an ordered list of values, the method comprising:
for each data object in a message to be signed, constructing a reference element, the reference element including a reference identifier, a pointer to a digest method, and a digest generated by applying the digest method to a given function of the data object;
constructing a signature element, the signature element including a signature information element associated with one or more reference elements, and a signature value generated by applying the signature method to the signature information element; and outputting the message and the signature element;

wherein at least one of the constructing or outputting steps is carried out using the processor.

11. The method as described in claim 10 further including constructing the signature information element, the signature information element including a pointer to the signature method, and a canonical form of one or more reference elements.

12. The method as described in claim 10 wherein the message is a JSON message.

13. The method as described in claim 10 wherein the signature element is detached from the message.

14. The method as described in claim 10 wherein the signature element is enveloped within the message.

15. The method as described in claim 10 wherein the first processing device comprises one of: a Web browser, and a Web server.

16. A computer program product comprising a non-transitory computer readable medium having a computer readable program, wherein the computer readable program when executed on a computer causes the computer to sign a JavaScript Object Notation (JSON) message according to the following method steps:

for each data object in the JSON message to be signed, constructing a reference element, the reference element including a reference identifier, a pointer to a digest method, and a digest generated by applying the digest method to a given function of the data object;

constructing a signature information element including a pointer to a signature method, and a canonical form of one or more reference elements; and constructing a signature element including the signature information element, and a signature value generated by applying the signature method to the signature information element.

17. The computer program product as described in claim 16 wherein the reference identifier identifies the data object in the JSON message for which the digest has been generated.

18. The computer program product as described in claim 16 wherein the signature element also includes a key information element that includes a key value for use to verify the signature value.

19. The computer program product as described in claim 16 wherein the given function is an ordered data object generated by applying a transform operation to the data object.

20. The computer program product as described in claim 16 wherein the canonical form of the one or more reference elements is generated by applying a canonicalization method to the one or more reference elements.

21. The computer program product as described in claim 16 wherein the computer readable program comprises a set of instructions downloaded over a network from a remote data processing system.

22. The computer program product as described in claim 16 wherein the computer readable program comprises a set of instructions are stored in the computer useable medium in a server data processing system, and wherein the set of instructions are downloaded over a network to a client data processing system.

23. Apparatus, comprising:

a processor;

a computer readable medium storing computer program instructions that, when executed by the processor, perform a method of signing a JSON message, the method comprising:

for each data object in the JSON message to be signed, constructing a reference element, the reference element including a reference identifier, a pointer to a digest method, and a digest generated by applying the digest method to a given function of the data object;

constructing a signature information element including a pointer to a signature method, and a canonical form of one or more reference elements; and constructing a signature element including the signature information element, and a signature value generated by applying the signature method to the signature information element.

* * * * *